United States Patent
Mansour et al.

(10) Patent No.: US 9,877,233 B1
(45) Date of Patent: Jan. 23, 2018

(54) COMMON AIR-INTERFACE CONTROL CHANNEL

(71) Applicant: Sprint Spectrum LP, Overland Park, KS (US)

(72) Inventors: Nagi Mansour, Arlington, VA (US); Emerino J. Marchetti, Clifton, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 518 days.

(21) Appl. No.: 13/934,116

(22) Filed: Jul. 2, 2013

(51) Int. Cl.
H04W 36/06 (2009.01)
H04W 36/00 (2009.01)

(52) U.S. Cl.
CPC .............. H04W 36/0005 (2013.01)

(58) Field of Classification Search
None
See application file for complete search history.

(56) References Cited

U.S. PATENT DOCUMENTS

| | | | |
|---|---|---|---|
| 7,254,119 B2* | 8/2007 | Jiang et al. | 370/328 |
| 8,271,029 B2 | 9/2012 | Karaoguz | |
| 2003/0086384 A1* | 5/2003 | Kwon | H04B 7/2637 370/320 |
| 2006/0146867 A1* | 7/2006 | Lee et al. | 370/465 |
| 2011/0255516 A1* | 10/2011 | Pawar et al. | 370/332 |
| 2012/0030378 A1* | 2/2012 | Kaila | H04L 67/1095 709/248 |
| 2012/0089845 A1* | 4/2012 | Raleigh | H04L 12/14 713/176 |
| 2012/0122511 A1* | 5/2012 | Antonio et al. | 455/522 |
| 2012/0270545 A1 | 10/2012 | Zhao et al. | |
| 2012/0294291 A1 | 11/2012 | Su et al. | |
| 2013/0029704 A1* | 1/2013 | Koo | H04W 72/1215 455/501 |
| 2013/0077482 A1* | 3/2013 | Krishna | H04W 36/22 370/230 |
| 2014/0044000 A1* | 2/2014 | Charbit | H04W 16/14 370/252 |
| 2014/0269610 A1* | 9/2014 | Hiben | H04W 36/14 370/331 |
| 2015/0181491 A1* | 6/2015 | Van Phan | H04W 28/08 370/331 |

* cited by examiner

*Primary Examiner* — Alex Skripnikov (57) ABSTRACT

A method of operating a communication system includes communicating a traffic channel information stream with a wireless device using a first air-interface scheme while communicating control channel information with the wireless device using the first air-interface scheme. The control channel information is communicated with the wireless device using the first air-interface scheme is used to handover the wireless device from the first air-interface scheme to a second air-interface scheme. After the handover of the wireless device from the first air-interface scheme to the second air-interface scheme, the traffic channel information stream is communicated with the wireless device using the second air-interface scheme while still communicating control channel information with the wireless device using the first air-interface scheme.

10 Claims, 5 Drawing Sheets

COMMON AIR-INTERFACE CONTROL CHANNEL

TECHNICAL BACKGROUND

Wireless communication may be used as a means of accessing a network. Wireless communication has certain advantages over wired communications for accessing a network. One of those advantages is a lower cost of infrastructure to provide access to many separate locations or addresses compared to wired communications. This is the so-called "last mile" problem. Another advantage is mobility. Wireless communication devices, such as cell phones, are not tied by wires to a fixed location. To use wireless communication to access a network, a customer needs to have at least one transceiver in active communication with another transceiver that is connected to the network.

To facilitate wireless communications, the Institute of Electrical and Electronics Engineers (IEEE) has promulgated a number of wireless standards. These include the 802.11 (WiFi) standards and the 802.16 (WiMAX) standards. Likewise, the International Telecommunication Union (ITU) has promulgated standards to facilitate wireless communications. This includes TIA-856, which is also known as Evolution-Data Optimized (EV-DO). The European Telecommunications Standards Institute (ETSI) has also promulgated a standard known as long term evolution (LTE). Additional standards such as the fourth generation communication system (4G) are also being pursued. These standards pursue the aim of providing a comprehensive IP solution where voice, data, and streamed multimedia can be given to users on an "anytime, anywhere" basis. These standards also aim to provide higher data rates than previous generations. All of these standards may include specifications for various aspects of wireless communication with a network. These aspects include processes for registering on the network, message formats, and air-interface schemes that detail aspects such as carrier modulation, subcarriers, frame structure, and frequency bands of operation.

These wireless standards typically specify one or more control channels. These control channels help wireless devices (and base stations) with various overhead tasks. These tasks can include, for example, configuration, connection to the wireless network, switching between cells (i.e., handover), paging, transmit power control, and/or security and encryption. The control channels may be grouped into categories. For example, in GSM networks, Control Channels can be broadly divided into 3 categories; Broadcast Control Channel (BCCH), Common Control Channel (CCCH), and Dedicated Control Channels (DCCH).

OVERVIEW

In an embodiment, a method of operating a communication system includes communicating a traffic channel information stream with a wireless device using a first air-interface scheme while communicating control channel information with the wireless device using the first air-interface scheme. The control channel information communicated with the wireless device using the first air-interface scheme is used to handover the wireless device from the first air-interface scheme to a second air-interface scheme. After the handover of the wireless device from the first air-interface scheme to the second air-interface scheme, the traffic channel information stream is communicated with the wireless device using the second air-interface scheme while still communicating control channel information with the wireless device using the first air-interface scheme.

In an embodiment, a method of operating a wireless communication system includes communicating a traffic stream with a first wireless device using a first air-interface scheme. The traffic stream is also communicated with the first wireless device using a second air-interface scheme. Communicating the traffic stream using the first air-interface scheme and switching to the second air-interface scheme is accomplished using information communicated on a control channel communicated using the first air-interface scheme.

In an embodiment, a communication system includes a first air-interface transceiver for communicating control channel information using a first air-interface scheme while communicating traffic stream information with a wireless device using the first air-interface scheme. The system also includes a second air-interface transceiver for communicating traffic stream information with the wireless device using the second air-interface scheme while the first air-interface transceiver communicates control channel information using the first air-interface scheme.

DETAILED DESCRIPTION

In an embodiment, a common set of air-interface control channels are used to serve two (or more) wireless technologies. For example, a single set of air-interface control channels are used to serve LTE and EV-DO. This can reduce latency when handing over a wireless device between these two technologies. The common control channels can be carried using a code division multiplexing (CDM) scheme while certain data (e.g., Voice over IP—VoIP) is carried using an OFDM scheme. For example, the control channels specified by LTE and EV-DO can be carried using CDM. The air-interface resources allocated to carrying data can be split between LTE specified resources that use OFDM and EV-DO specified resources that use code division multiple access (CDMA).

Figure 1:
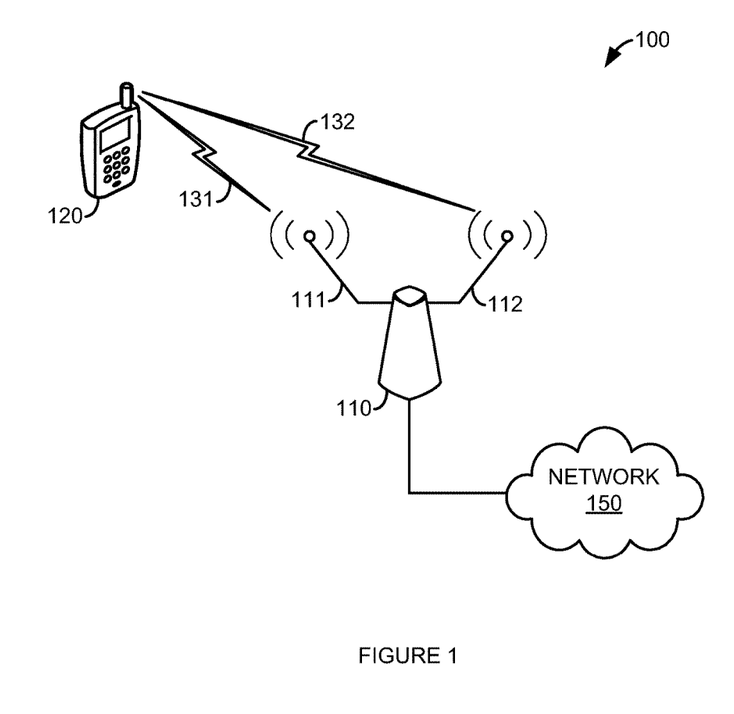
FIG. 1 is a block diagram illustrating a communication system.

FIG. 1 is a block diagram illustrating a communication system. In FIG. 1, communication system 100 comprises access node 110, wireless device 120, and network 150. Access node 110 includes at least air-interface 111 and air-interface 112. Wireless device 120 is operatively coupled to access node 110 using air-interface 111 via wireless link 131. Wireless device 120 can be operatively coupled to access node 110 using air-interface 112 via wireless link 132. Access node 110 is operatively coupled to network 150.

Network 150 is a communication network that can provide communication between access node 110 and other wired or wireless networks. Communication system 100 can comprise wired and/or wireless communication networks that include processing nodes, routers, gateways, physical and/or wireless data links for carrying data among various network elements, including combinations thereof, and can include a local area network, a wide area network, and an internetwork (including the Internet). Communication system 100 can also comprise wireless networks, including base station, wireless communication nodes, telephony switches, internet routers, network gateways, computer systems, communication links, or some other type of communication equipment, and combinations thereof.

Wired network protocols that may be utilized by communication system 100 and/or network 150 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Wireless network protocols that may be utilized by communication system 100 and/or network 150 may comprise code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX).

Other network elements may be present in communication system 100 (and present in wireless network 150, in particular) to facilitate wireless communication to/from wireless device 120 but are omitted for clarity, such as base stations, base station controllers, gateways, mobile switching centers, dispatch application processors, and location registers such as a home location register or visitor location register. Furthermore, other network elements may be present to facilitate communication between access node 110 and network 150 which are omitted for clarity, including additional processing nodes, routers, gateways, and physical and/or wireless data links for carrying data among the various network elements.

In an embodiment, air-interface 111 of access node 110 may communicate with wireless device 120 via wireless link 131 using a first air-interface scheme. For example, air-interface 111 may provide wireless air-interface communication that is based on code division multiplexing (CDM), code division multiple access (CDMA) or time division multiple access (TDMA). In another example, air-interface 111 of access node 110 may provide an air-interface specified according to cellular phone technology standards that use CDM. Examples of cellular phone technology air-interface standards that are based on CDM include, but are not limited to, EV-DO and Global System for Mobile communications (GSM). Other types of CDM air-interfaces may be provided by access node 110. Air-interface 111 may be or include a CDM based air-interface transceiver. For example, air-interface 111 may be or include an EV-DO based air-interface transceiver.

Air-interface 112 of access node 110 may communicate with wireless device 120 via wireless link 132 using a second air-interface scheme. For example, air-interface 112 may provide wireless air-interface communication based on orthogonal frequency division multiplexing (OFDM) or orthogonal frequency division multiple access (OFDMA). In another example, air-interface 112 of access node 110 may provide an air-interface specified according to a published standard that uses OFDM. Examples of standard specified air-interface technologies that use OFDM include, but are not limited to, WiMAX and LTE. Other types of OFDM air-interfaces may be provided by access node 110. Air-interface 112 may be or include an OFDM based air-interface transceiver. For example, air-interface 112 may be or include an LTE based air-interface transceiver. Air-interface 111 and air-interface 112 may use separate antennas.

Wireless device 120 may be any device, system, combination of devices, or other such communication platform capable of communicating with access node 110 via air-interface 111 and air-interface 112, and via wireless links 131 and 132, respectively. As discussed above, wireless links 131 and 132 provide communication between wireless device 120 and access node 110 using two different types of air-interfaces 111 and 112. Wireless device 120 may be, for example, a mobile phone, a wireless phone, a wireless modem, a personal digital assistant (PDA), a voice over internet protocol (VoIP) phone, a voice over packet (VOP) phone, or a soft phone, as well as other types of devices or systems that can exchange data with access node 110 via wireless links 131 and 132. Other types of communication platforms are possible.

Access node 110 may be any wireless system that provides two different air-interface schemes to wireless device 120, and communication connectivity to network 150. Air-interface 111 and air-interface 112 may be any wireless system that provides a single air-interface to wireless device 120, and communication connectivity to network 150. Examples of access nodes, base stations, and wireless stations that may be utilized include, base transceiver stations (BTSs), radio base stations (RBSs), Node B, enhanced Node B (eNBs) and others. Access nodes, base stations, and wireless stations may include a number of elements known to those skilled in the art comprising a transceiver, power amplifier, combiner, duplexer, antenna and control function.

Air-interface 111 communicates, via wireless link 131, control channel information with wireless device 120. Air-interface 111 communicates control channel information with wireless device 120 using a first (e.g., CDM based) air-interface scheme. Air-interface 111 can also communicate traffic stream information with wireless device 120 using the first air-interface scheme while communicating control channel information with wireless device 120 using the first air-interface scheme.

Air-interface 112 can communicate, via wireless link 132, traffic stream information with wireless device 120. Air-interface 112 can communicate traffic stream information with wireless device 120 using a second (e.g., OFDM based) air-interface scheme. Air-interface 112 can communicate traffic stream information with wireless device 120 using the second air-interface scheme while air-interface 111 communicates control channel information with wireless device 120 using the first (e.g., CDM based) air-interface scheme.

Access node 110 can handoff a traffic stream between air-interface 111 and air-interface 112 using the control channel information communicated using air-interface 111. In other words, air-interface 111 and air-interface 112 share control channels that are provided by air-interface 111. These shared control channels can be used to handoff traffic streams from air-interface 111 to air-interface 112, and vice versa. Since the shared control channels do not switch between air-interface 111 and air-interface 112 during a handoff of a traffic stream (or channel), the handoff can occur faster (i.e., with reduced latency when compared to re-establishing one or more control channels on the new air-interface every time a handoff between air-interface 111 and air-interface 112 occurs).

Communication system 100 can communicate a traffic channel information stream with wireless device 120 using air-interface 111 (which uses a first air-interface scheme) while communicating control channel information with wireless device 120 using air-interface 111. Thus, communication system 100 can use the first air-interface scheme to communicate both traffic channel information stream(s) and control channel information with wireless device 120 concurrently.

Communication system 100 can use control channel information communicated with wireless device 120 using air-interface 111 to handover wireless device 120 from the air-interface 111 to air-interface 112 (which uses a second air-interface scheme). After the handover of wireless device 120 from air-interface 111 to air-interface 112, communication system 100 can communicate traffic channel information stream(s) with wireless device 112 using air-interface 112 while communicating control channel information with wireless device 120 using air-interface 111.

Communication system 100 can use control channel information communicated with wireless device 120 using air-interface 111 to hand back wireless device 120 from air-interface 112 to air-interface 111. After the handover of wireless device 120 from air-interface 112 to air-interface 111, the traffic channel information stream(s) are communicated with wireless device 120 using air-interface 111 while communicating control channel information with wireless device 120 using air-interface 111.

In an embodiment, access node 110 can communicate a traffic stream with a wireless device 120 using air-interface 111. Access node 110 can also communicate the traffic stream with wireless device 120 using air-interface 112. Access node 110 can switch between communicating the traffic stream using air-interface 111 and air-interface 112 using information communicated on a control channel communicated using air-interface 111. In other words, the traffic stream can be communicated with wireless device 120 using air-interface 112 while control channel information associated with wireless device 120 is communicated using air-interface 111.

In an embodiment, the control channel information associated with wireless device 120 is communicated using air-interface 111 is time-division multiplexed with air-interface 112 communicating the traffic stream. While communicating the traffic stream with wireless device 120 using air-interface 111, a second wireless device (not shown in FIG. 1) can be communicated with using air-interface 112.

Figure 2:
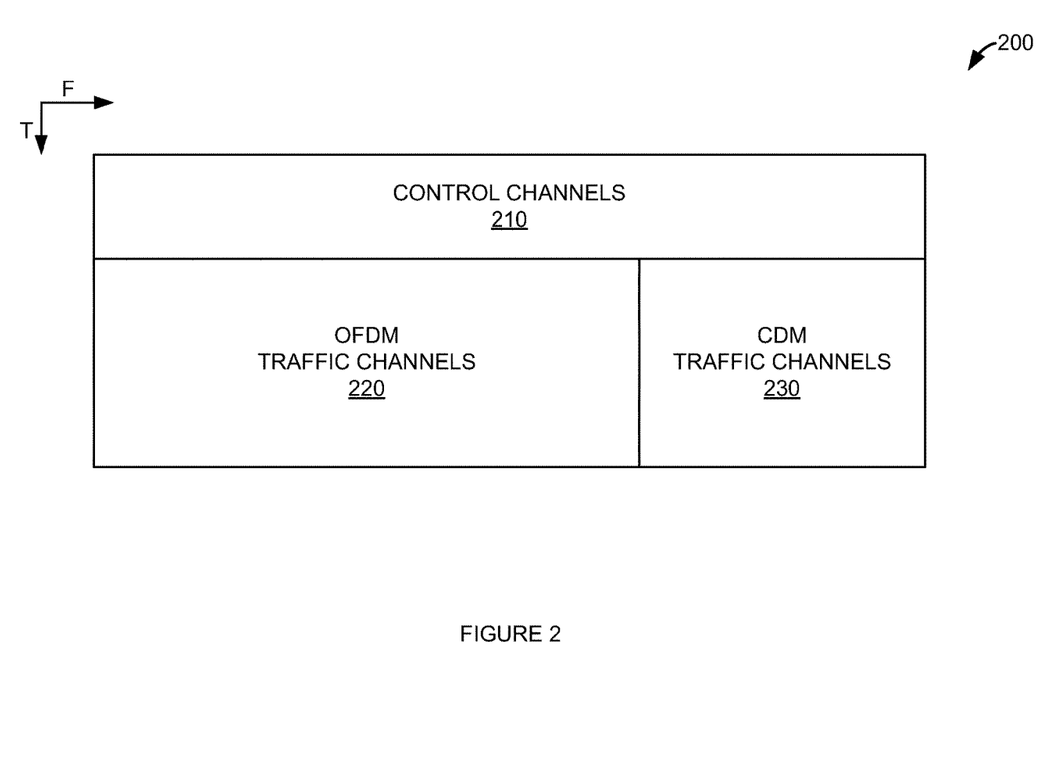
FIG. 2 is a diagram illustrating an air-interface resource allocation.

FIG. 2 is a diagram illustrating an air-interface resource allocation. The air-interface resource allocation illustrated in FIG. 2 may be used by access node 110 to allocate air-interface resources between air-interface 111 and air-interface 112. In FIG. 2, air-interface resource allocation 200 is shown. FIG. 2 has frequency distributed across the horizontal axis and time across the vertical axis. In FIG. 2, air-interface resource allocation 200 includes control channels 210, OFDM traffic channels 220, and CDM traffic channels 230. Control channels 210 are shown occupying all of the frequency range of air-interface resource allocation 200 for a portion of the time of air-interface resource allocation 200. OFDM traffic channels 220 and CDM traffic channels 230 split the frequency range of air-interface resource allocation 200 for rest of the time of air-interface resource allocation 200.

In an example, control channels 210 communicate control channel information for all of air-interface resource allocation 200 using air-interface 111. In other words, the air-interface allocation for control channels 210 provides control information that is used to communicate traffic channels communicated using the OFDM traffic channel 220 and CDM traffic channel 230 portions of air-interface resource allocation 200. In an example, the control channel information for LTE based OFDM traffic channels 220 and the control channel information for EV-DO based CDM traffic channels 230 are both carried by a CDM based air-interface allocation for control channels 210. LTE based OFDM traffic channels 220 may be communicated by access node 110 using air-interface 112. EV-DO based CDM traffic channels 230 may be communicated by access node 110 using air-interface 111.

Figure 3:
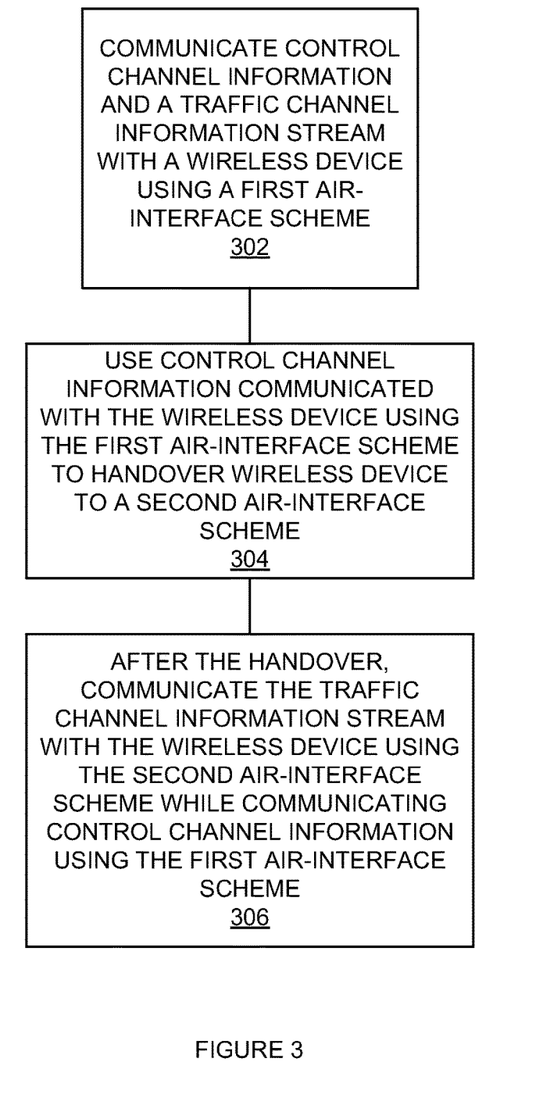
FIG. 3 is a flowchart illustrating a method of operating a communication system.

FIG. 3 is a flowchart illustrating a method of operating a communication system. The steps illustrated in FIG. 3 may be performed by one or more elements of communication system 100. Control channel information and a traffic channel information stream are communicated with a wireless device using a first air-interface scheme (302). For example, access node 110 may communicate control channel information and a traffic channel information stream to wireless device 120 using air-interface 111.

Control channel information communicated with the wireless device using the first air-interface scheme is used to handover the wireless devise to a second air-interface scheme (304). For example, control channel information communicated by access node 110 to wireless device 120 using air-interface 111 can be used to handover wireless device 120 to air-interface 112. Once handed over, wireless device 120 communicates the traffic stream with access node 110 via air-interface 112.

After the handover, the traffic channel information stream is communicated with the wireless device using the second air-interface scheme while the control channel information is communicated using the first air-interface scheme (306). For example, after the traffic channel information stream is handed over to air-interface 112, access node 110 still communicates control channel information via air-interface 111.

Control channel information communicated with the wireless device using the first air-interface scheme can be used to hand back the wireless device from the second air-interface scheme to the first air-interface scheme. For example, control channel information communicated with wireless device 120 using air-interface 111 can be used to handover a traffic stream from air-interface 112 to air-interface 111.

Figure 4:
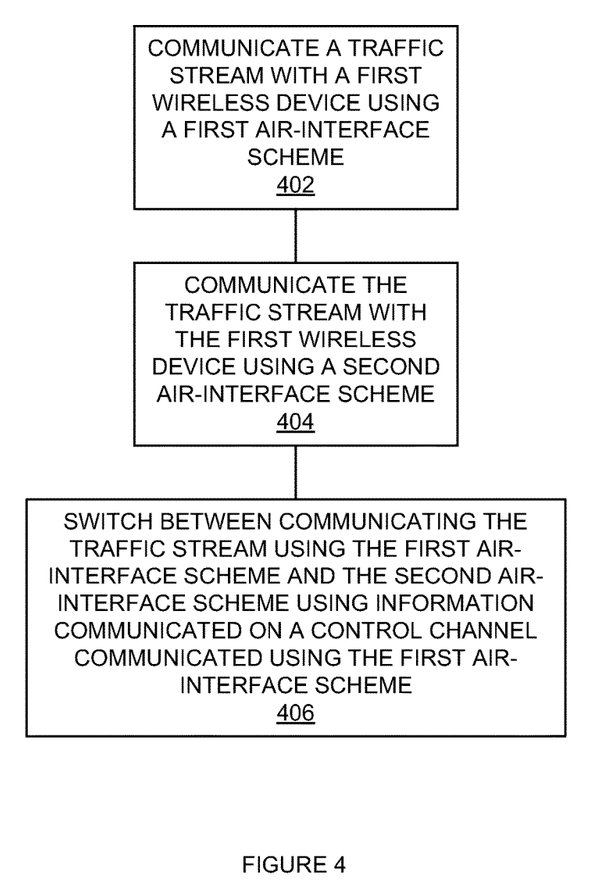
FIG. 4 is a flowchart illustrating a method of operating a wireless communication system.

FIG. 4 is a flowchart illustrating a method of operating a communication system. The steps illustrated in FIG. 4 may be performed by one or more elements of communication system 100. A traffic stream is communicated with a first wireless device using a first air-interface scheme (402). For example, access node 110 can communicate a traffic stream with wireless device 120 using air-interface 111.

The traffic stream is communicated with the wireless device using a second air-interface scheme (404). For example, access node 110 can communicate the traffic stream with wireless device 120 using air-interface 112. Using information communicated on a control channel that uses the first air-interface scheme, the traffic stream is switched between being communicated using the first air-interface scheme and the second air-interface scheme (406). For example, using control channel information communicated via air-interface 111, access node 110 (and wireless device 120) can switch a traffic stream between air-interface 111 and air-interface 112 (and vice versa). In another example, access node 110 (and wireless device 120) can, using control channel information communicated using control channels 210, switch a traffic stream between being carried by an OFDM traffic channel allocation 220 and a CDM traffic channel allocation 230.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication system 100 may be, comprise, or include computers systems and/or processing nodes. This includes, but is not limited to: wireless device 120, access node 110, and/or network 150.

Figure 5:
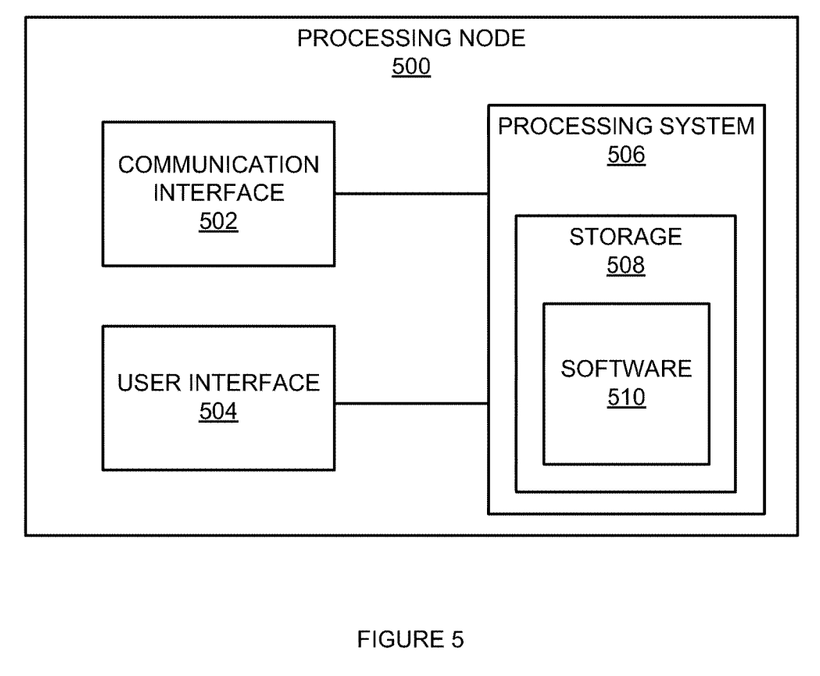
FIG. 5 illustrates a processing node.

FIG. 5 illustrates an exemplary processing node 500 comprising communication interface 502, user interface 504, and processing system 506 in communication with communication interface 502 and user interface 504. Processing node 500 is capable of paging a wireless device. Processing system 506 includes storage 508, which can comprise a disk drive, flash drive, memory circuitry, or other memory device. Storage 508 can store software 510 which is used in the operation of the processing node 500. Storage 508 may include a disk drive, flash drive, data storage circuitry, or some other memory apparatus. Software 510 may include computer programs, firmware, or some other form of machine-readable instructions, including an operating system, utilities, drivers, network interfaces, applications, or some other type of software. Processing system 506 may include a microprocessor and other circuitry to retrieve and execute software 510 from storage 508. Processing node 500 may further include other components such as a power management unit, a control interface unit, etc., which are omitted for clarity. Communication interface 502 permits processing node 500 to communicate with other network elements. User interface 504 permits the configuration and control of the operation of processing node 500.

Examples example of processing node 500 includes access node 110. Processing node 500 can also be an adjunct or component of a network element, such as an element of access node 110, network 150, air-interface 111, air-interface 112, wireless device 120, a mobility management entity, a gateway, a proxy node, or another network element in a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a communication system, comprising:
   communicating a traffic stream to a wireless device from an access node over a first air-interface of the access node using a first air-interface scheme; and
   performing a handoff of the traffic stream from the first air-interface to a second air-interface of the access node, the second air-interface being configured to communicate the traffic stream to the wireless device using a second air-interface scheme while the first air-interface communicates control channel information over a control channel of the first air-interface for both the first air-interface and the second air-interface using the first air-interface scheme
      wherein the control channel information for the first air-interface and the second air-interface is communicated to the wireless device over the control channel of the first air-interface using a code-division multiplexing,
      wherein the traffic stream is communicated over the second air-interface to the wireless device using orthogonal frequency division multiplexing, and
      wherein the control channel is allocated a dedicated portion of time of frequency ranges of air-interface resources from the first air-interface and the second air-interface that is separate from remaining portions of time of the frequency ranges of the air-interface resources allocated to the traffic stream communicated over the first air-interface and the second air-interface.

2. The method of claim 1, further comprising:
   switching from communicating the traffic stream to the wireless device using the second air-interface to using the first air-interface and the control channel information communicated by the first air-interface; and
   after switching from communicating the traffic stream to the wireless device using the second air-interface to the first air-interface, communicating the traffic stream with the wireless device using the first air-interface scheme while communicating the control channel information to the wireless device using the first air-interface scheme.

3. The method of claim 1, wherein the first air-interface scheme is transmitted from the access node using a first antenna and the second air-interface scheme is transmitted from the access node using a second antenna.

4. The method of claim 1, wherein the first air-interface scheme is specified by EV-DO and the second air-interface scheme is specified by LTE.

5. A method of operating a wireless communication system, comprising:
   communicating a traffic stream with a first wireless device over a first air-interface using a first air-interface scheme;
   communicating the traffic stream with the first wireless device over a second air-interface using a second air-interface scheme; and,
   switching between communicating the traffic stream over the first air-interface using the first air-interface scheme and over the second air-interface using the second air-interface scheme based on control information of both the first air-interface and the second air-interface communicated over a control channel of the first air-interface to the wireless device using the first air-interface scheme,
      wherein the control channel information for the first air-interface and the second air-interface is communicated to the wireless device over the control channel of the first air-interface using a code-division multiplexing, wherein the traffic stream is communicated over the second air-interface to the wireless device using orthogonal frequency division multiplexing, and wherein the control channel is allocated a dedicated portion of time of frequency ranges of air-interface resources from the first air-interface and the second air-interface that is separate from remaining portions of time of the frequency ranges of the air-interface resources allocated to the traffic stream communicated over the first air-interface and the second air-interface.

6. The method of claim 5, wherein the traffic stream with the wireless device is communicated using the second air-interface scheme while the control information of both the first air-interface and the second air-interface is communicated using the first air-interface scheme.

7. The method of claim 5, further comprising:

while communicating the traffic stream with the first wireless device using the first air-interface scheme, communicating with a second wireless device using the second air-interface scheme.

8. The method of claim 5, wherein the first air-interface scheme is specified by EV-DO and the second air-interface scheme is specified by LTE.

9. A communication system, comprising:

a first air-interface transceiver, the first air-interface transceiver configured to communicate a traffic stream to a wireless device over a first air-interface using a first air-interface scheme; and, a second air-interface transceiver, the second air-interface transceiver configured to communicate the traffic stream to the wireless device over a second air-interface using a second air-interface scheme while the first air-interface transceiver communicates control channel information for both the first air-interface and the second air-interface to the wireless device over a control channel of the first air-interface using the first air-interface scheme, wherein the control channel information for the first air-interface and the second air-interface is communicated to the wireless device over the control channel of the first air-interface using a code-division multiplexing, wherein the traffic stream is communicated over the second air-interface to the wireless device using orthogonal frequency division multiplexing, and wherein the control channel is allocated a dedicated portion of time of frequency ranges of air-interface resources from the first air-interface and the second air-interface that is separate from remaining portions of time of the frequency ranges of the air-interface resources allocated to the traffic stream communicated over the first air-interface and the second air-interface.

10. The communication system of claim 9, wherein the communication system is configured to handoff the traffic stream from the first air-interface to the second air-interface based on the control channel information communicated over the control channel of the first air-interface by the first air-interface transceiver using the first air-interface scheme.

* * * * *